(12) United States Patent
Rohmer

(10) Patent No.: US 11,679,614 B2
(45) Date of Patent: Jun. 20, 2023

(54) METHOD FOR PRODUCING A MOLDED PART

(71) Applicant: NOVEM Car Interior Design GmbH, Vorbach (DE)

(72) Inventor: Klaus Rohmer, Hof (DE)

(73) Assignee: NOVEM CAR INTERIOR DESIGN GMBH, Vorbach (DE)

( * ) Notice: Subject to any disclaimer, the term of this patent is extended or adjusted under 35 U.S.C. 154(b) by 358 days.

(21) Appl. No.: 16/925,109

(22) Filed: Jul. 9, 2020

(65) Prior Publication Data

US 2021/0008914 A1  Jan. 14, 2021

(30) Foreign Application Priority Data

Jul. 10, 2019 (DE) .......................... 102019118684.6

(51) Int. Cl.
*B41M 3/12* (2006.01)
*B44C 1/175* (2006.01)
*B41M 7/02* (2006.01)
*B41J 2/005* (2006.01)
(Continued)

(52) U.S. Cl.
CPC .............. *B41M 3/12* (2013.01); *B32B 38/04* (2013.01); *B41J 2/0057* (2013.01); *B41M 7/02* (2013.01);
(Continued)

(58) Field of Classification Search
CPC .. A61B 8/00; A61B 8/12; A61B 8/145; A61B 8/4218; A61B 8/4254;
(Continued)

(56) References Cited

U.S. PATENT DOCUMENTS

| 5,294 A | * | 9/1847 | Levett et al. | ........... B05C 1/083 433/199.1 |
| 1,433,892 A | * | 10/1922 | Kelly | ....................... B41M 1/34 427/272 |
| 3,365,321 A | * | 1/1968 | Adler | ....................... B05D 1/32 427/370 |

(Continued)

FOREIGN PATENT DOCUMENTS

| DE | 102013108666 A1 | 3/2015 |
| DE | 102010016794 B4 | 6/2018 |
| DE | 102017104658 A1 | 9/2018 |

OTHER PUBLICATIONS

English translation of DE10201308666.*
English translation of DE102017104658.*
English translation of DE102010016794.*

*Primary Examiner* — Sonya M Sengupta
(74) *Attorney, Agent, or Firm* — Workman Nydegger

(57) ABSTRACT

A method of producing a molded part comprising a decorative coating with a molded part front side designed as visible side and a rear side opposing the front side and a substrate arranged on the rear side of the decorative coating, wherein the decorative coating comprises (or is formed from) a decorative layer, wherein the method comprises: providing the decorative layer or decorative coating, attaching the substrate to the rear side of the decorative layer or coating, applying a resist lacquer to the front side of the decorative layer by means of a digital printing machine, the resist lacquer being applied in sections to the front side of the decorative layer to form a pattern or symbol or a negative of a pattern or symbol such that lacquer-free surface areas and surface areas covered with resist lacquer are created on the front side of the decorative layer.

14 Claims, 2 Drawing Sheets

(51) Int. Cl.
  *B32B 38/04* (2006.01)
  *B29C 37/00* (2006.01)
(52) U.S. Cl.
  CPC ........ *B44C 1/1752* (2013.01); *B29C 37/0025* (2013.01)
(58) Field of Classification Search
  CPC ..... A61B 8/4444; A61B 8/445; A61B 8/4455; A61B 8/4477; A61B 8/4488; A61B 8/4494; A61B 8/54; B44C 1/1752; B44C 1/222; B44C 5/0453; B44C 1/005; B44C 3/005; B41M 3/12; B41M 7/02; B41M 7/00; B41M 5/0047; B41M 5/0058; B41J 2/0057; G01S 15/003; G01S 15/8929
  USPC ................ 427/261, 264, 270, 271, 275, 287
  See application file for complete search history.

(56) References Cited

U.S. PATENT DOCUMENTS

| | | | | |
|---|---|---|---|---|
| 4,271,224 | A * | 6/1981 | Mizuno | D06P 5/004 8/456 |
| 5,721,007 | A * | 2/1998 | Lynch | H05K 3/108 216/13 |
| 2007/0026203 | A1* | 2/2007 | Yamano | B41M 7/0045 428/195.1 |
| 2015/0042084 | A1* | 2/2015 | Staub | B42D 25/445 283/92 |
| 2018/0215190 | A1* | 8/2018 | Reuther | B42D 25/364 |
| 2020/0001647 | A1* | 1/2020 | Reuther | B44C 1/1756 |
| 2021/0008914 | A1* | 1/2021 | Rohmer | B44C 5/0453 |

\* cited by examiner

METHOD FOR PRODUCING A MOLDED PART

CROSS-REFERENCE TO RELATED APPLICATIONS

The present invention claims the benefit of and priority to German Patent Application No. 10 2019 118 684.6, filed on Jul. 10, 2019. The entire content of the aforementioned patent application is incorporated herein by reference.

BACKGROUND OF THE INVENTION

1. The Field of the Invention

The invention relates to a method for producing a molded part, in particular a decorative part and/or trim part designed as a molded part for a vehicle interior.

2. Background and Relevant Art

Numerous decorative and trim parts are installed in vehicle interiors, such as door trim, console panels, and instrument panels. The decorative and trim parts also include control buttons and their covers.

With such molded parts, there are always high demands on the visual design and great value is placed on attractive patterns and sometimes filigree designs with special effects.

One way to create different patterns is to use resist lacquer. Until now, the screen printing method has normally been used for printing resist lacquer. However, this requires a lot of effort for preparing, storing, and cleaning the screen. In addition, the graphic possibilities are limited when using the screen printing method and there may be inaccuracies in the fit for large screens.

BRIEF SUMMARY OF THE INVENTION

The underlying object of the invention is therefore to provide a novel method for producing a molded part, in particular a method which at least largely overcomes the aforementioned disadvantages.

This object is achieved by the features of claim 1. Advantageous embodiments and refinements are provided in each of the dependent claims.

The inventive method for producing a molded part, in particular a decorative part and/or a trim part designed as a molded part for a vehicle interior, the molded part comprising a decorative coating with a molded part front side designed as visible side and a rear side opposing the front side and a substrate arranged on the rear side of the decorative coating, wherein the decorative coating comprises a decorative layer or is formed from a decorative layer, comprises the steps:

Providing the decorative layer or decorative coating,
Attaching the substrate to the rear side of the decorative layer or coating,
Applying a resist lacquer to the front side of the decorative layer by means of a digital printing machine, the resist lacquer being applied in sections to the front side of the decorative layer to form a pattern or symbol or a negative of a pattern or symbol such that lacquer-free surface areas and surface areas covered with resist lacquer are created on the front side of the decorative layer.

Surprisingly, it has been found that resist lacquer can also be processed with known digital printing machines. The advantages of the invention are thus, in particular, that molded parts can be printed with resist lacquer by means of known digital printing machines with the method according to the invention, which opens up new possibilities for different types of decorative patterns. Furthermore, the direct pressure on the material simplifies the process and achieves a flexible, rapid, and inexpensive method. Both vector and pixel graphics can be used for printing the molded part, and it is possible to place them on the molded part in a precise manner. In addition, semi-tones and color gradients can be realized, and it is also possible to implement particularly delicate decorative patterns.

The digital printing machine preferably comprises a 4-color print head, the resist lacquer being applied by means of the 4-color print head, and/or the digital printing machine comprising a print head with resist lacquer nozzle, the resist lacquer being applied by means of the resist lacquer nozzle. Thus it is possible to achieve good resolution even at 300 dpi; resolutions up to 700 dpi and higher are possible. In addition, the printing carried out by means of a digital printing machine can be combined with color and haptic printing and/or with screen or roller printing.

One refinement of the invention provides that the decorative layer is a metal sheet, preferably an aluminum sheet, the application of the resist lacquer being followed by a milling and/or brushing step in which the surface of the metal sheet is milled and/or brushed, the applied resist lacquer withstanding the milling and/or brushing, so that in the lacquer-free surface areas a surface hatching is produced on the metal sheet by means of the milling and/or brushing.

It can be provided that the resist lacquer is removed, in particular washed off, following the milling and/or brushing step, so that the surface of the metal sheet on the surface areas previously covered with resist lacquer remains untreated, that is, without surface hatching, compared to the milled and/or brushed surface areas.

The resist lacquer is preferably removed in a system, in particular a stripping system.

It can be provided that the resist lacquer is removed in one or more sub-steps, in particular in a number of washing and/or etching steps and/or chemical cleaning steps and/or radiation steps.

It can also be provided that the milling and/or brushing step is carried out with a milling and/or brushing tool.

One refinement of the invention provides that the milling and/or brushing step is carried out once or several times, in particular in succession, and/or that the surface of the metal sheet is partially milled and/or brushed or is milled and/or brushed across the entire surface.

For example, milling and/or brushing creates a cut with one or more cut directions on the surface of the metal sheet.

It can be provided that the pattern and/or symbol to be printed or the negative of the pattern and/or symbol to be printed is provided digitally by scanning a template or by using templates from a database and is made available to the digital printer.

According to one embodiment of the invention, in a final step, in particular after application of the resist lacquer and/or following the milling and/or brushing step and/or after removal of the resist lacquer, a protective and/or optical layer, in particular, a protective lacquer or a protective film, is applied to the front side of the decorative coating.

One refinement of the invention provides that the pattern and/or symbol, or the negative of the pattern and/or symbol to be printed, represents or embodies a textured structure and/or lettering. Other design options include organic decorative patterns, gradients or photo-realistic decorative patterns.

It can be provided that the resist lacquer is applied in one or more colors, and/or that one or more colored coatings are applied in addition to the resist lacquer.

Furthermore, it can be provided that the resist lacquer for forming the decorative coating is printed partially or over the entire surface area on the front side of the decorative layer in one or more coatings, in particular in order to form a three-dimensional surface structure on the front side of the decorative layer.

BRIEF DESCRIPTION OF THE DRAWINGS

The inventive method is explained in more detail below also with regard to further features and advantages on the basis of the description of exemplary embodiments of the method and with reference to the accompanying schematic drawings. In the figures.

Corresponding parts and components are also identified with the same reference numbers in each of the various figures and exemplary embodiments.

DETAILED DESCRIPTION OF THE PREFERRED EMBODIMENTS

Figure 1A:
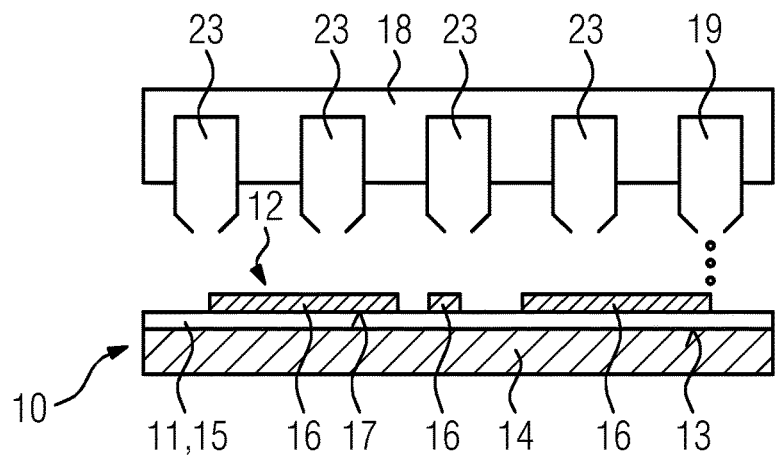
FIG. 1a provides a schematic sectional depiction of the molded part to be produced during the printing.

FIG. 1a illustrates the application of the resist lacquer 16 to the front side 17 of the decorative layer 15 or decorative coating 11. This step follows a decorative layer 15 or decorative coating 11 being provided and the substrate 14 being attached to the rear side 13 of the decorative layer 15. A symbol 25 is applied to the front side 17 of the decorative layer 15 by means of a digital printing machine with a print head 18 that comprises four ink nozzles 23 and is expanded by a resist lacquer nozzle 19.

Figure 1B:
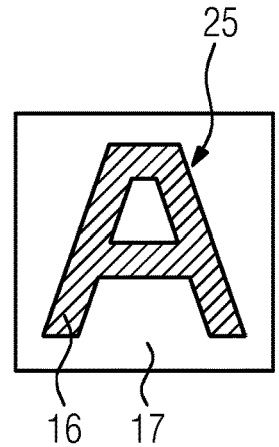
FIG. 1b provides a schematic plan view of the molded part to be produced following the printing.

FIG. 1b provides a plan view of the front side 17 of the decorative layer 15 with the symbol 25 formed from resist lacquer 16. By way of example, the symbol is the letter "A."

Figure 2A:
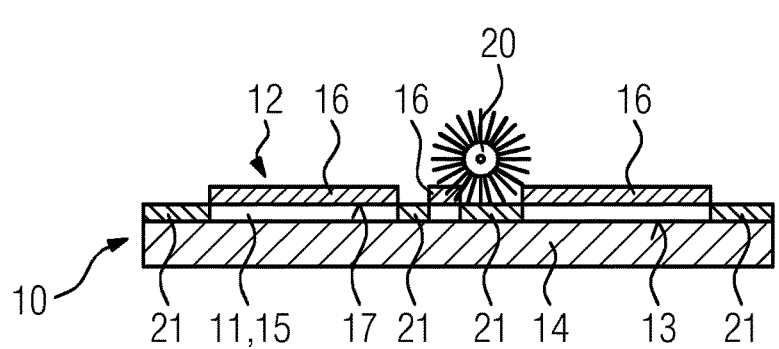
FIG. 2a provides a schematic sectional depiction of the molded part to be produced during the brushing.

FIG. 2a illustrates the brushing of the front side 17 of the decorative layer 15 by means of a brushing tool 20, the resist lacquer 16 withstanding the brushing and a surface hatching 21 being produced in the lacquer-free surface areas of the decorative layer 15.

Figure 2B:
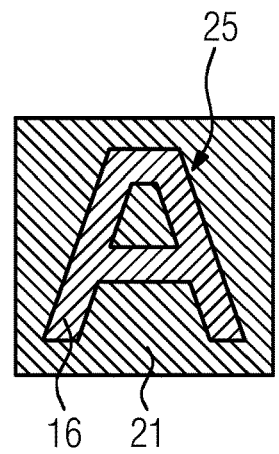
FIG. 2b provides a schematic plan view of the molded part to be produced following the brushing.

FIG. 2b provides the plan view of the decorative layer 15 with the symbol 25 formed from the resist lacquer 16 and the surface hatching 21 in the surface areas that are free of the lacquer following brushing of the front side 17.

Figure 3A:
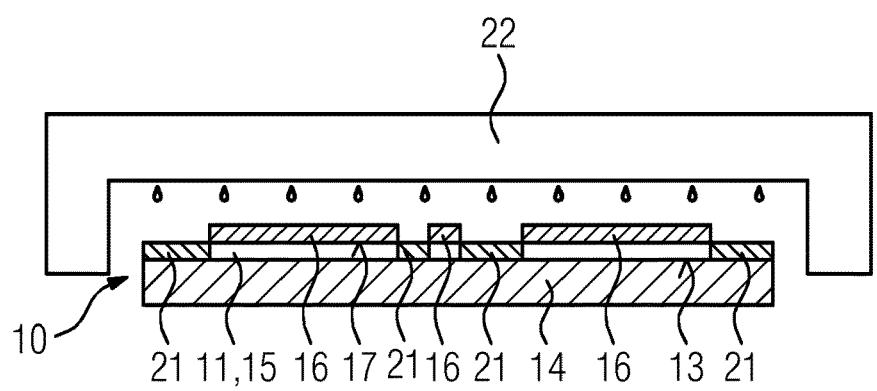
FIG. 3a provides a schematic sectional depiction of the molded part to be produced during the removal of the resist lacquer.

FIG. 3a illustrates the removal of resist lacquer 16 in a stripping system 22. The surface areas previously covered with resist lacquer 16 are washed off in this step, so that the surface areas previously covered with resist lacquer 16 remain untreated compared to the brushed surface areas with surface hatching 21.

Figure 3B:
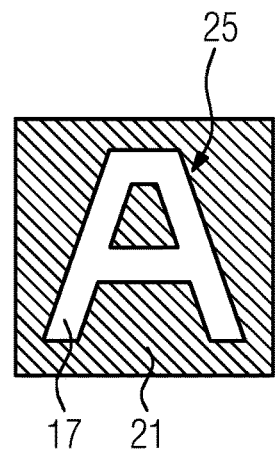
FIG. 3b provides a schematic plan view of the molded part to be produced following the removal of the resist lacquer.

FIG. 3b provides the plan view of the molded part front side 12 following the removal of the resist lacquer 16. In contrast to the surface hatching 21 caused by brushing in the previously lacquer-free areas, the symbol 25 on the front side 17 of the decorative layer 15 previously covered with resist lacquer 16 remains untreated.

Figure 4:
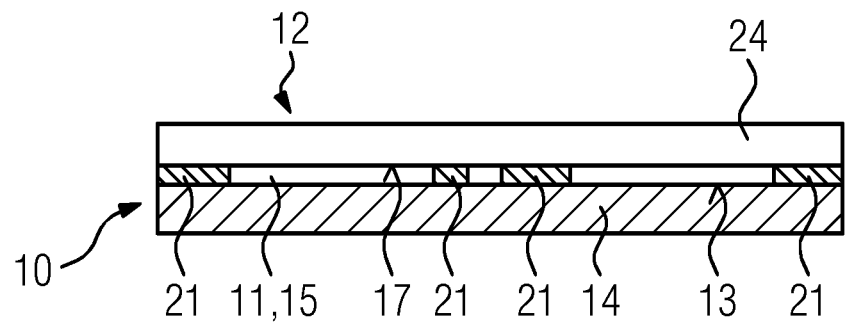
FIG. 4 provides a schematic sectional depiction of the molded part to be produced following the application of a protective coating.

FIG. 4 illustrates the molded part 10 following the removal of the resist lacquer 16, with the surface hatching 21 in the surface areas that were not covered with the resist lacquer 16. A protective film designed as a protective coating 24 is also attached to the molded part front side 12.

Figure 5:
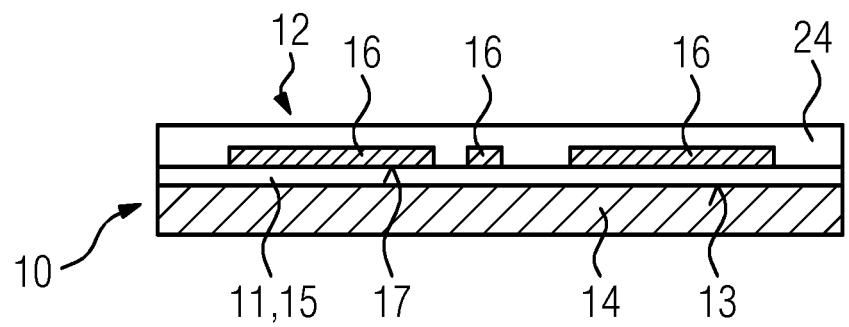
FIG. 5 provides a schematic sectional depiction of an alternative embodiment of the molded part to be produced.

FIG. 5 illustrates an alternative embodiment of the method for producing a molded part 10 in which the resist lacquer 16 remains on the front side 17 of the decorative layer 15 and a protective coating 24 is applied to the molded part front side 12 designed as the visible side.

LIST OF REFERENCE NUMBERS

10 Molded part
11 Decorative coating
12 Molded part front side
13 Rear side
14 Substrate
15 Decorative layer
16 Resist lacquer
17 Front side
18 Printer head
19 Resist lacquer nozzle
20 Milling and/or brushing tool
21 Surface hatching
22 Stripping system
23 Ink nozzle
24 Protective and/or optical layer
25 Symbol

I claim:

1. A method for producing a molded part, wherein:
the molded part comprises (i) a decorative coating with a molded part front side designed as a visible side and a rear side opposing the front side, and (ii) a substrate arranged on the rear side of the decorative coating, the decorative coating comprising a decorative layer or embodying a decorative layer; and
the method comprises:
providing the decorative layer or decorative coating;
attaching the substrate to the rear side of the decorative layer or decorative coating;
applying a resist lacquer to the front side of the decorative layer by means of a digital printing machine;
wherein the resist lacquer being applied in sections to the front side of the decorative layer to form a pattern or a symbol or a negative of a pattern or a symbol, such that lacquer-free surface areas and surface areas covered with resist lacquer are created on the front side of the decorative layer.

2. The method according to claim 1, wherein:
the digital printing machine comprises a 4-color print head; and
the resist lacquer is applied by means of at least one of:
the 4-color print head, or the digital printing machine comprising a print head with a resist lacquer nozzle, the resist lacquer being applied by means of the resist lacquer nozzle.

3. The method according to claim 1, wherein:
the decorative layer is a metal sheet;
the application of the resist lacquer being followed by a refinement step in which the metal sheet is at least one of (i) milled in a milling step or (ii) brushed in a brushing step;
the applied resist lacquer withstanding the refinement step, so that in the lacquer-free surface areas a surface hatching is produced on the metal sheet by means of the refinement step.

4. The method according to claim 3, wherein:
the resist lacquer is removed following the refinement step, so that the surface of the metal sheet on the surface areas previously covered with resist lacquer remains untreated compared to the surfaces that have undergone the refinement step.

5. The method according to claim 4, wherein:
the resist lacquer is removed in a system.

6. The method according to claim 4, wherein:
the resist lacquer is removed in one or more substeps.

7. The method according to claim 3, wherein:
the refinement step is carried out with at least one of (i) a milling tool or (ii) a brushing tool.

8. The method according to claim 3, wherein:
the refinement step is carried out once or several times; and
the surface of the metal sheet undergoes the refinement step over at least part of the entire surface.

9. The method according to claim 3, wherein:
the refinement step creates a cut with one or more cut directions on the surface of the metal sheet.

10. The method according to claim 1, wherein:
the pattern and/or symbol to be printed or the negative of the pattern and/or symbol to be printed is:
digitally provided by (i) scanning a template or by (ii) using templates from a database; and
made available to the digital printer.

11. The method according to claim 1, wherein:
in a final step, at least one of (i) a protective or (ii) an optical layer is applied to the front side of the decorative coating.

12. The method according to claim 1, wherein:
the pattern and/or symbol or the negative of the pattern and/or symbol to be printed represents or embodies a textured structure or lettering.

13. The method according to claim 1, wherein color is applied by one of:
(i) the resist lacquer is applied in one or more colors; or
(ii) one or more colored coatings are applied in addition to the resist lacquer.

14. The method according to claim 1, wherein:
the resist lacquer for forming the decorative coating is printed partially or over the entire surface area on the front side of the decorative layer in one or more coatings.

* * * * *